US012775835B1

(12) United States Patent
Lewin et al.

(10) Patent No.: US 12,775,835 B1
(45) Date of Patent: Oct. 27, 2026

(54) DETECTING OFFENSIVE IDENTIFIERS USING MACHINE LEARNING

(71) Applicant: Amazon Technologies, Inc., Seattle, WA (US)

(72) Inventors: Gareth Neal Lewin, Burnaby (CA); Lena Evans, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1212 days.

(21) Appl. No.: 17/154,963

(22) Filed: Jan. 21, 2021

(51) Int. Cl.

| | |
|---|---|
| ***G06N 3/08*** | (2023.01) |
| ***G06F 16/955*** | (2019.01) |
| ***G06F 18/21*** | (2023.01) |
| ***G06F 18/214*** | (2023.01) |
| ***G06F 18/24*** | (2023.01) |
| ***G06F 40/20*** | (2020.01) |
| ***H04L 65/65*** | (2022.01) |

(52) U.S. Cl.
CPC ........... *G06N 3/08* (2013.01); *G06F 16/9566* (2019.01); *G06F 18/2155* (2023.01); *G06F 18/24* (2023.01); *G06F 40/20* (2020.01); *H04L 65/65* (2022.05)

(58) Field of Classification Search
CPC ............ G06N 5/00; G06N 20/00; G06N 5/04; G06N 5/02; G06N 5/01; G06N 5/022
See application file for complete search history.

(56) References Cited

U.S. PATENT DOCUMENTS

| | | | |
|---|---|---|---|
| 7,752,274 B2 | 7/2010 | Pagan | |
| 8,074,162 B1 | 12/2011 | Cohen | |
| 8,868,408 B2 | 10/2014 | Spears | |
| 9,405,741 B1 | 8/2016 | Schaaf et al. | |
| 10,534,827 B2 | 1/2020 | Spears | |
| 10,635,750 B1 | 4/2020 | Epstein et al. | |
| 2015/0070516 A1 | 3/2015 | Shoemake et al. | |
| 2019/0197477 A1* | 6/2019 | Muller | G06F 17/00 |

OTHER PUBLICATIONS

Fortuna et al., A Survey on Automatic Detection of Hate Speech in Text, 2018 (Year: 2018).*
Ranasinghe et al., Deep Learning Models for Multilingual Hate Speech and Offensive Language Identification, 2019 (Year: 2019).*
Cao et al., DeepHate: Hate Speech Detection via Multi-Faceted Text Representations, 2020 (Year: 2020).*
Boustani et al., Gaming the Name: Player Strategies for Adapting to Name Constraints in Online Videogames, 2020 (Year: 2020).*
Rami Al-Rfou, "Character-Level Language Modeling with Deeper Self-Attention" (Year: 2018).*
Brian Hu Zhang, et al., "Mitigating Unwanted Biases with Adversarial Learning", arX1v:1801.07593v1, Jan. 22, 2018, pp. 1-7.
Gregor Wiedemann, et al., "Transfer Learning from LDA to BiLSTM-CNN for Offensive Language Detection in Twitter", arXiv:1811.02906v1, Nov. 7, 2018, pp. 1-10.

* cited by examiner

*Primary Examiner* — Van C Mang
(74) *Attorney, Agent, or Firm* — S. Scott Foster; Kowert, Hood, Munyon, Rankin & Goetzel, P.C.

(57) ABSTRACT

A data set including identifiers with respective acceptability labels is used to train a neural network-based model which generates acceptability scores for proposed identifiers submitted to an application. The identifiers do not include word separators. The model includes a character-level embedding layer. Using a trained version of the model, an acceptability score is obtained for a proposed identifier, and one or more operations are initiated based at least in part on the obtained score.

20 Claims, 10 Drawing Sheets

DETECTING OFFENSIVE IDENTIFIERS USING MACHINE LEARNING

BACKGROUND

Some popular Internet-accessible applications and services allow large numbers of end users to interact with one another using publicly-displayed content, such as streams of chat messages submitted by the users. Such services may be used, for example, by hundreds of thousands of end users to watch live-streamed events such as video game competitions, and to provide feedback which is displayed in real time.

An end user of such a service is typically required to choose a user name (sometimes referred to as an account name) at the time that the end user signs up for the service. Some services may allow the end users to choose names comprising any desired sequence of characters from a set of characters of the end users' preferred language. The chosen user names may not necessarily reveal the end user identities, as long as they follow the rules of the service—e.g., a rule requiring that the user names comprise a contiguous sequence of alphanumeric characters and (if desired) underscores, and that the user names be no longer than N characters. After a proposed user name is accepted by the service, that user name may be displayed for view by other users at various points in time, e.g., fairly prominently in a stream of chat messages updated in real time. Many services attempt to smooth the process of onboarding new users, so proposed user names may have to be approved (or rejected) fairly quickly.

In some cases, a user name chosen by an end user may, if accepted by the service, end up causing offence to other end users when it is displayed publicly via the interfaces of the service. Offensive names may, for example, comprise subsequences of characters which comprise (or sound similar to) abusive terms in one or more languages, refer to particular subsets of the user population in a denigrating manner, and so on. In some cases, the offense may only become clear if the user names are pronounced in a certain way, if some numerals are interpreted as similar-looking alphabet characters or vice versa, and so on. Offensive names may be chosen inadvertently by some users, and deliberately by other users. The task of identifying offensive user names and other entity identifiers rapidly and preventing the display of such identifiers to a wide audience remains a non-trivial technical challenge.

Figure 1:
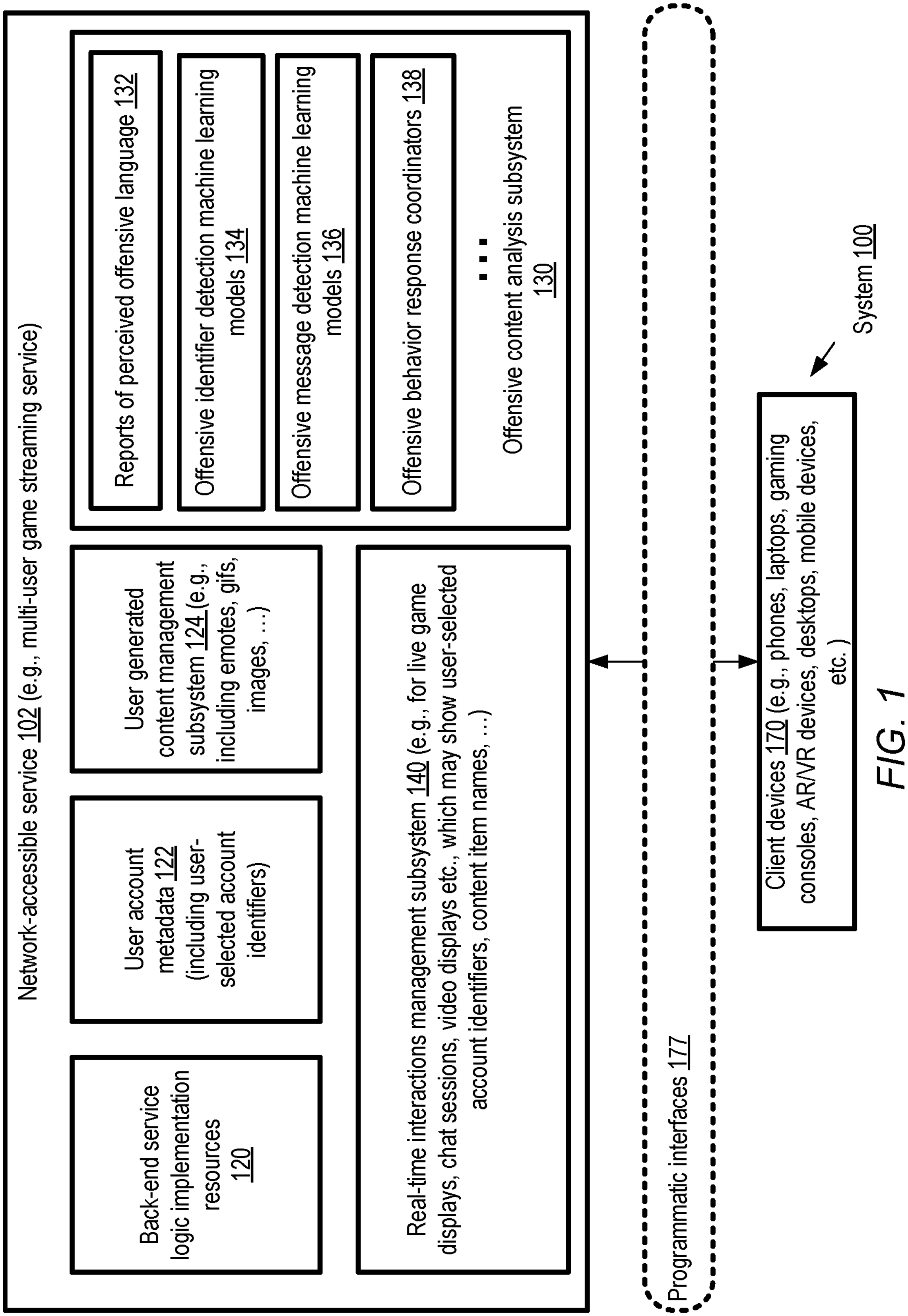
FIG. 1 illustrates an example system environment in which proposed identifiers which may cause offence may be detected at a network-accessible service using a machine learning model which includes a character-level embedding layer and does not perform word-sequence based analysis, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficiently detecting, using a machine learning model, whether a proposed identifier such as a user name submitted to a multi-user interactive service by a user is acceptable, from the perspective of potential offense which may be caused if and when the proposed identifier is made visible or audible to other users. Unlike some conventional approaches, which rely on matching potential identifiers with pre-selected lists, pre-defined static rules, or dictionaries of potentially offensive terms which may be hard to keep current, the proposed technique is capable of predicting whether an identifier is likely to be offensive by analyzing the sequence of characters within the identifier itself. The proposed methodology is designed to work with identifiers comprising contiguous strings of characters which do not contain word separators such as whitespace; as such, an identifier does not have to be analyzed as a sequence of distinct words whose collective meaning has to be inferred, as is done in some techniques used to detect abusive messages and the like.

As one skilled in the art will appreciate in light of this disclosure, certain embodiments may be capable of achieving various advantages, including some or all of the following: (a) substantially enhancing the experience of end users of large-scale interactive applications and services, e.g., by preventing the dissemination of offensive identifiers such as user names, especially in scenarios in which some end users make deliberate and repeated attempts to offend others, (b) reducing the amount of computing and storage resources needed for detecting offensive content at such applications and services, and/or (c) reducing the amount of computing and other resources consumed in managing user information of the applications and services, by lowering the likelihood that approved user names have to be retroactively suspended or rejected.

According to some embodiments, a system may comprise one or more computing devices. The computing devices may include instructions that upon execution on or across the one or more computing devices cause the one or more computing devices to select, from a plurality of candidate entity identifiers associated with a network-accessible service or application, an acceptable identifier subset and an unacceptable identifier subset. At least some of the candidate entity identifiers may have been submitted earlier by users of the network-accessible service and exposed to other users of the network-accessible service via one or more programmatic interfaces. In various embodiments, at least some of the candidate entity identifiers may comprise respective strings of characters which do not include word delimiters. At least some members of the unacceptable identifier subset may violate an offensive terminology criterion of the network-accessible service; the criterion may have been developed based for example based on reports, submitted by various users of the service over some time period, of unacceptable or offensive identifiers, and/or on linguistic heuristics developed at the service. In at least some embodiments, individual identifiers included in the acceptable and/or unacceptable subsets may be expressed in any of several supported languages or scripts (e.g., the Latin script, Cyrillic script, etc.). As such, the model may be considered language agnostic in such embodiments.

Using a training data set which includes at least some identifiers of the acceptable subset and some identifiers of the unacceptable subset (with associated labels indicating the acceptability or unacceptability levels of the individual identifiers), a neural network-based machine learning model may be trained in various embodiments to generate respective acceptability scores for proposed entity identifiers submitted to the network-accessible service. The model may perform character-level analysis in at least some embodiments, e.g., it may include a character-level embedding layer and an intra-identifier self-attention module. The self-attention module may, for example, assign weights to different characters of the identifiers to indicate the respective learned importance of the different characters. In at least some embodiments, the model may not include a word-level embedding layer or word sequence analysis components of the kind which are used to analyze sentences comprising multiple words/tokens. A trained version of the model may be stored.

In at least some embodiments, when a proposed entity identifier is received at the service from a user, e.g., during the workflow or interaction sequence for signing up or registering for the service, an acceptability score for the proposed entity identifier may be generated using the trained version of the model. Based at least in part on a determination as to whether the acceptability score satisfies a threshold criterion, the proposed identifier may be accepted or rejected in some embodiments by the service. If the proposed identifier is accepted, the user who submitted the identifier may be permitted to proceed to continue with further interactions using the identifier at the service. If the proposed identifier is rejected, the user may be required to submit a different proposed identifier in some embodiments. In one embodiments, one of two levels of acceptance may be indicated by the service for a given identifier upon receiving the identifier: a provisional or probationary acceptance which requires additional verification actions (such as phone based authentication, email based authentication etc.) to be performed before the user is able to interact further with some or all features of the service, or a full acceptance which does not require such verification actions.

Any of several different categories of identifiers may be analyzed for acceptability at a variety of applications or services in different embodiments using a machine learning model of the kind introduced above. The categories may include, for example, user names, client account names, displayed user names (which may be permitted to differ from user names or client account names in some applications), labels of icons or videos displayed by a service or application, hashtags used to refer to various topics on social media applications, URL (Universal Record Locator) shorteners used to make it easier to access web sites, portions or all of domain names assigned to web sites, file names, storage object names and the like.

In some embodiments, at least a portion of the training data labels may be derived using analysis of offense reports or complaints submitted by users of the application or service. For example, in one implementation, if the number or count of received complaints/reports indicating that a particular identifier (which was earlier approved for use by a service) is found to be objectionable (by other users of a trusted set of users) exceeds a threshold, that particular identifier may be labeled as unacceptable. In some embodiments, one or more human auditors may make the final decision on labeling an identifier (which was previously approved) as unacceptable. In at least one embodiment, user metadata stored at a service may be used to identify examples of acceptable identifiers and generate corresponding acceptability labels for the service. For example, end users of the service may be classified into groups based on factors such as their respective engagement levels (how many times the users interact with the service over various time periods, how long the users have remained active at the service, and so on), and identifiers provided by users belonging to trusted or engaged categories may be labeled as acceptable. In some embodiments, identifiers may be generated or synthesized at least partially using randomization for inclusion in the acceptable or unacceptable subsets—e.g., a term known to be offensive may be combined with randomly selected inoffensive characters to form an unacceptable example, or completely random strings may be used as examples of acceptable identifiers.

In at least one embodiment, the neural network-based model used for acceptability analysis of proposed identifiers may include an adversarial de-biasing module, which may be used to reduce (or eliminate) biases that may have been introduced into the model (for example, due to the techniques used to construct the training data set). Input provided to the de-biasing module during training of the model may include a representation of a set of protected words, phrases or terms (e.g., terms representing subsets of a country's population which have historically suffered from discrimination). An output of the de-biasing module (such as one of multiple loss function values used in the training) for a particular proposed identifier may indicate a probability of a presence or indication of one or more of the protected terms, words or phrases in the proposed identifier, and/or in metadata pertaining to the user who submitted the particular proposed identifier. The de-biasing module may be referred to as "adversarial" in some embodiments because the training objective may comprise minimizing a loss function associated with acceptability score, while simultaneously maximizing the loss function associated with the protected terms and the de-biasing. As such, the two losses may be competing with one another during training, so that the model as a whole becomes more capable of identifying identifiers which contain protected words/phrases, and ensuring that such identifiers are not discriminated against when it comes to generating the final acceptability score. After training, at inference time, the output of the de-biasing module may not be used directly in at least some embodiments; however, because of the way in which the de-biasing related loss function was used during training, the learned parameters of the model layers may automatically reduce the bias against protected terms at inference time. If such de-biasing is not performed, it may become possible for malicious users to deliberately cause user identifiers comprising or indicating protected terms/words to be deemed unacceptable with a high probability (e.g., by repeatedly submitting numerous identifiers which (a) contain the protected terms and (b) are offensive for other reasons). Note that the de-biasing module may also help reduce the impact of unconscious or inadvertent biases in various embodiments; as such, its benefit may not be limited to such deliberately introduced biases.

According to some embodiments, phonetic or audio representations of at least a portion of various identifiers may be generated, and combined with the original or raw characters of the identifiers as part of the input provided to the machine learning model. Such phonetic representations may be useful in detecting offensive identifiers because in some cases the sound of the pronounced identifiers may more clearly indicate offensive characteristics than the raw characters themselves. Often, the offense may arise from hidden puns, wordplay and the like, which may not become apparent unless the identifiers are pronounced or spoken, and attempts to try to distinguish the meanings of the identifiers from textual analysis may by themselves be insufficient to detect the probability of causing offense. In some embodiments, one or more other machine learning models may be used to generate phonetic representations from the raw visual/written representations of the identifiers.

In at least one embodiment, if and when a proposed identifier is found to be unacceptable or offensive as part of the identifier content analysis (e.g., if the acceptability score generated for it is below a threshold), a set of experiments or analyses may be conducted in an effort to obtain an explanation as to why the proposed identifier is unacceptable. In such experiments, variants of the original identifier (e.g., with a given character substituted by one or more other characters, or removed entirely) may be supplied as input to the trained version of model, and respective acceptability scores may be obtained for the variants. By comparing the acceptability scores of the variants, particular characters which contributed more to the original identifier's score may be identified, and such characters may help formulate an explanation for the score. An explanation indicating the relative contribution levels of the different characters to the unacceptable score may then be prepared and provided, e.g., to administrators of the service or application for which identifier content analysis is being performed, to auditors assigned to review the quality of the generated scores, and/or to the end users who proposed the identifiers which were found unacceptable.

In at least some embodiments, the machine learning model used for identifier content analysis may be retrained periodically, e.g., daily or weekly, using an updated training data set derived in part from the most recently received set of user complaints. If the retrained model provided improved offense detection capabilities (as may be determined using an evaluation data set) than the earlier version, the retrained model may be used for analyzing submissions of new identifiers going forward. The retrained model may be used to review the acceptance of at least a subset of the earlier accepted identifiers in some embodiments. As a result, it may sometimes be the case that an identifier which was initially approved may later be suspended or rejected after using a newer version of the model to generate an updated acceptability score.

According to some embodiments, a machine learning service used to train and/or run a model of the kind described above may be implemented at a provider network, and/or the multi-user interaction streaming application or service for which proposed identifiers are analyzed may itself be implemented using resources of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a machine learning service (which may also be referred to as an analytics service). A VCS may also be referred to as an elastic compute service, virtual machines service, computing cloud service, compute engine, and/or cloud compute in various implementations. Programmatic interfaces of the machine learning service may be used by components of the application for which identifier analysis is to be performed, for example, to request training or execution of the model used for identifier analysis and/or to indicate various configuration preferences pertaining to identifier content analysis.

Example System Environment

FIG. 1 illustrates an example system environment in which proposed identifiers which may cause offence may be detected at a network-accessible service using a machine learning model which includes a character-level embedding layer and does not perform word-sequence based analysis, according to at least some embodiments. As shown, system 100 comprises resources and artifacts of network-accessible service 102, including for example back-end service logic implementation resources 120, user account metadata 122, user generated content management subsystem 124, real-time interactions management subsystem 140, and an offensive content analysis subsystem 130 in the depicted embodiment. Each of these subcomponents of the network-accessible service may be implemented or managed using one or more computing devices in various embodiments. The network-accessible service 102 may support thousands of concurrent users who can interact with one another via a set of programmatic interfaces 177, e.g., to watch a live streaming display of video games being played and provide feedback or input via chat messages which are also displayed live. Service 102 may also be referred to as a multi-user online interaction service. Programmatic interfaces 177 may, for example, include web-based interfaces (such as chat windows, video display windows, image display windows, audio playing web components, multi-user interactive online streaming interfaces etc.), graphical user interfaces and the like. For some types of interactions, such as administrative interactions, the network-accessible service may also support command line tools and/or application programming interfaces (APIs) in various embodiments. Users may interact with the service 102 using programmatic interfaces 177, from a variety of client devices 170 in the depicted embodiment, such as phones, laptops, gaming consoles or players, augmented reality (AR) or virtual reality (VR) devices, desktops, mobile devices such as tablets and the like in at least some embodiments.

The presentation of content accessible from the network-accessible service may be managed by real-time interactions management subsystem 140, and the presented content may include user-select account identifiers or user identifiers in the depicted embodiment. The business logic of one or more applications implemented at the network-accessible service (e.g., decisions as to exactly which of several views of a game are to be shown next) may be implemented at resources 120. Metadata 122 pertaining to user accounts may in some embodiments include account identifiers, client account names, or user names selected by users, icons or images to be displayed along with the user names, the real names of the users, telephone numbers, age and other demographic information provided by the users at the time of signing up for the service, categories into which individual users have been placed based on their respective engagement levels or duration of active interactions with the service, and so on. The network-accessible service 102 may store user-generated content at subsystem 124, including for example emotes (custom images selected by users to express emotions or messages, with associated text labels or codes also selected by users), emoticons, user-generated gifs, videos or audios to be shared with other users, etc. in the depicted embodiment.

The offensive content analysis subsystem 130 may be used to detect potentially offensive content (at least from the perspective of some subsets of users of the service) associated with the network-accessible service 102 in the depicted embodiment. The service 102 may enable users to submit reports of perceived offensive language 132, including offensive user identifiers, user-generated content identifiers, and the like in various embodiments. Such reports may also be referred to as offence reports or complaints. Based at least in part on such reports and/or other reports of unacceptable user behavior, some number of user-submitted identifiers may be rejected or suspended in the depicted embodiment.

One or more offensive behavior response coordinators 138 may be responsible for orchestrating the training and execution of a set of machine learning models to be used to detect offensive content in the depicted embodiment. At least one machine learning model may be used specifically to detect offensive identifiers, while one or more other models may be used to detect offensive message contents (e.g., contents of chat messages, where each message may include multiple words) as a separate exercise in the example scenario depicted in FIG. 1. In effect, an offensive identifier detection machine learning model 134 may analyze the content of individual identifiers, working at the character level and/or using phonetic representations, while an offensive message detection machine learning model 136 may analyze the sequences of words that make up messages, working at the word or token level.

In at least some embodiments, a database of submitted entity identifiers (e.g., user identifiers, account identifiers, user-generated content identifiers, and the like) may be maintained at the network-accessible service, e.g., as part of the user account metadata 122 and/or the user generated content management subsystem 124. This database may include candidate entity identifiers that were accepted upon submission and have been displayed to service users, as well as entity identifiers which were rejected or suspended, e.g., as a result of complaints from other users, and/or based on a set of offensive terminology criterion of the service 102. An offensive terminology criterion may, for example, indicate that if complaints from at least N distinct trusted users of the service 102 are received independently with respect to a given entity identifier, that identifier should be declared unacceptable. From such a collection of identity identifiers, an acceptable identifier subset and an unacceptable identifier subset may be selected to form a training data set for an offensive identifier detection machine learning model 134, e.g., by offensive behavior response coordinators 138 in the depicted embodiment. Individual entity identifiers may comprise respective strings of characters which do not include word delimiters such as white space in at least some embodiments.

Using the training data set, a neural network-based offensive identifier detection machine learning model 134 may be trained to generate acceptability scores for proposed entity identifiers submitted to the network-accessible service 102. The model 134 may comprise at least (a) a character-level embedding layer and (b) a self-attention module, and may not include a word-level embedding layer or other components which analyze sequences of words in the depicted embodiment. In contrast, offensive message detection machine learning models 136, which may also be trained and run by the offensive behavior response coordinators 138, may include word-level embedding layers and word sequence analysis components. In at least some embodiments, the offensive identifier detection model may also include a de-biasing component as well as other types of neural network layers, as described below in further detail.

After the offensive identifier detection model has been trained, a trained version of the model may be stored in the depicted embodiment. In at least some embodiments, new versions of the model may be trained periodically, e.g., each day or each week, using the latest set of collected training examples, and the new versions may be used to replace the older versions if the performance achieved by the newer versions (e.g., on a holdout set of identifiers used for evaluation) is superior to that of the older versions. When new entity identifiers are submitted to the service 102, e.g., as part of an account establishment workflow, a trained version of the offensive identifier detection model may be executed to obtain an acceptability score for the submitted identifier. If the score is below a threshold, in at least some embodiments, the identifier may be rejected (and added to the database of rejected/unacceptable identifiers, from which a subsequent training data set may be prepared for re-training the model). If the score is above a threshold, the identifier may be accepted, and the identifier may also be added to the database used for generating training data. A user whose identifier is rejected may be prompted to try a different identifier in at least some embodiments.

Example Architecture of Model Used for Offensive Identifier Detection

Figure 2:
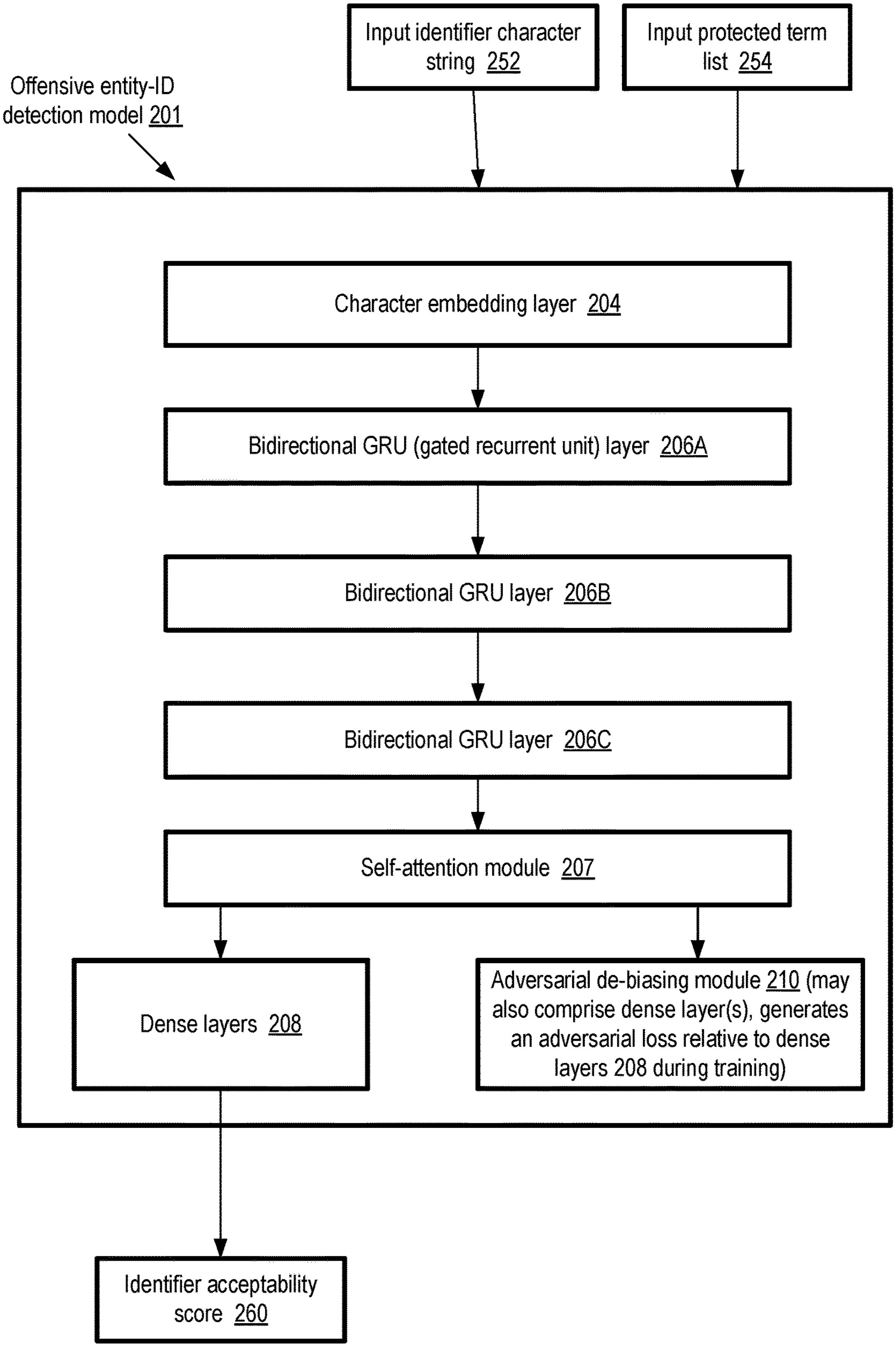
FIG. 2 illustrates an architecture of an example neural network-based machine learning model which may be used for offensive entity identifier detection, according to at least some embodiments.

FIG. 2 illustrates an architecture of an example neural network-based machine learning model which may be used for offensive entity identifier detection, according to at least some embodiments. In the depicted scenario, offensive entity identifier detection model 201 comprises a character-level embedding layer 204, bidirectional gated recurrent units (GRU) layers 206A, 206B and 206C, a self-attention module 207, dense layers 208 and an adversarial de-biasing module 210. The input to the model 201 comprises an input identifier expressed as a character string 252, and a list 254 of protected terms with respect to which potential biases are to be counteracted using de-biasing module 210. The output of the model is an identifier acceptability score 260 generated for the input identifier string, which may be used for example at a network accessible service or application similar to service 102 of FIG. 1 to make decisions as to whether or not to allow further use of the identifier string. In at least some implementations, a higher acceptability score (e.g., expressed as a real number between 0.0 and 1.0) for a given identifier may represent a lower estimated risk of that identifier causing offence. In some implementations, a lower score may indicate a lower risk of causing offence.

The character-level embedding layer 204 may prepare a representation, within a high-dimensional embedding space, for each of the characters which constitute the input identifier string. In one implementation, for example, one or more one-dimensional convolution neural network (1-D CNNs) may be used to generate or learn vector representations of the individual characters making up the input identifier. For example, for representing a given character within a given identifier, a vector consisting of N real numbers may be learned, where N is a tunable hyper-parameter of the model. This character-level analysis differs from word-level embedding techniques used in many natural language analysis algorithms, in which each word is represented by a learned vector which captures semantics and syntax of the word; in scenarios in which input identifier strings comprising contiguous characters without word delimiters are to be analyzed for potential to cause offence, such word-level analysis may not be as applicable. In other implementations, techniques that do not use CNNs may be employed for character-level embedding. Character-level embedding may also be referred to as character embedding, and word-level embedding may also be referred to as word embedding. The bidirectional GRU layers 206 may learn parameters indicative of the sequence in which the characters are arranged. The self-attention module 207 may learn weights indicative of the relative importance of the individual characters making up the identifier string, analyzing the entire string holistically and not just taking the immediate neighbors of individual characters into account.

The adversarial de-biasing module 210 which may be used to reduce (or eliminate) biases that may have been introduced into the model due to the techniques used to construct the training data set, may itself comprise one or more dense or fully-connected layers in some embodiments. Input used at the de-biasing module during training of the model may include a representation of a list of protected words, phrases or terms (e.g., terms representing subsets of a country's population which have historically been discriminated against). A loss function computed using the de-biasing module for a particular input identifier may indicate a probability of a presence or indication of one or more of the protected terms, words or phrases in the input identifier, and/or in metadata pertaining to the user who submitted the particular input identifier. The de-biasing module may be referred to as "adversarial" in some embodiments because the training objective may comprise minimizing a loss function associated with the acceptability score, while simultaneously maximizing the loss function computed using the de-biasing module. Note that variants of the example architecture shown in FIG. 2 may be employed in at least some embodiments—for example, the number of GRU layers may differ from the three layers shown in the example, other types of recurrent neural layers (such as long short-term memory units or LSTMs) may be used instead of or in addition to the GRUs, and so on.

Example Training Data Set Preparation

Figure 3:
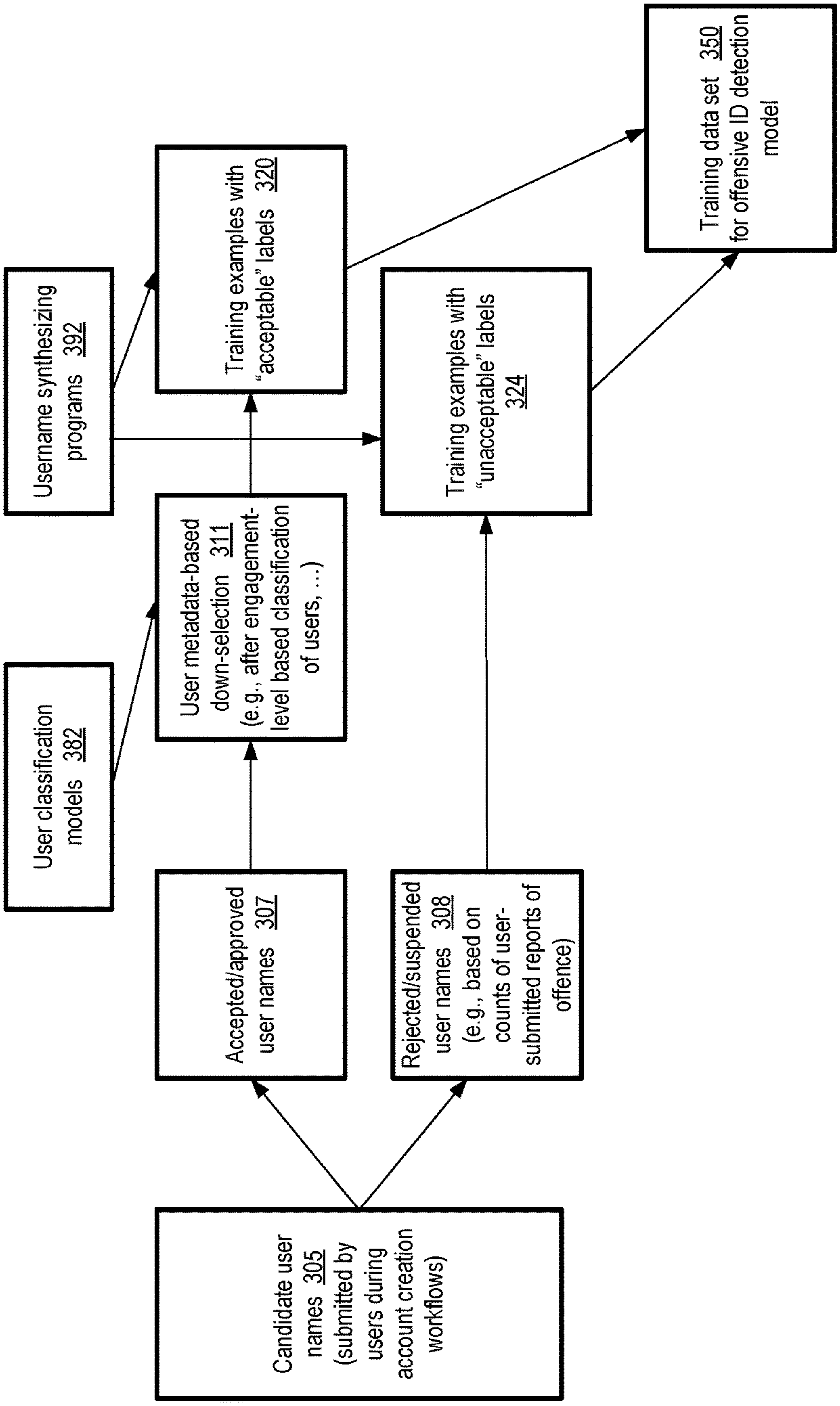
FIG. 3 illustrates example steps of preparation of a training data set for a machine learning model which generates acceptability scores for identifiers, according to at least some embodiments.

FIG. 3 illustrates example steps of preparation of a training data set for a machine learning model which generates acceptability scores for identifiers, according to at least some embodiments. In the example scenario depicted in FIG. 3, the entity identifiers which are analyzed are user names; however, similar techniques may be used for other categories of entity identifiers, such as icon labels, video labels, URL shorteners and the like in various embodiments. The process illustrated in FIG. 3 may be employed not just for an initial training of the model, but also retraining of the model in at least some embodiments.

In the depicted embodiment, a collection of candidate user names 305, submitted for example during account creation workflows in the case of user names, may be accumulated at a network-accessible service similar to service 102 of FIG. 1. From the candidate user names collection or database, two subsets may be extracted: accepted or approved user names 307, and rejected/suspended user names 308. The user names in subset 308 may have been rejected/suspended for a variety of reasons in different embodiments, such as the count of user-submitted reports of offence or abuse directed at individual ones of the user names included in the subset 308, or based on low acceptability scores generated by an earlier version of the model.

At least some of the rejected/suspended user names 308 may be used as training examples 324 which are labeled as "unacceptable" in the depicted embodiment. In some embodiments, user metadata-based down-selection operations 311 may be performed on the accepted/approved user names 307 to determine the training examples 320 to which the "acceptable" label is assigned. For example, there may be hundreds of thousands, or even millions, of accepted user names in the candidate user names collection, and one or more user classification models 382 may be used to group the user names into categories such as "engaged users"

versus "casual users" versus "new users" in some embodiments. Users may be classified as "engaged", for example, based on the rate at which they interact with the service or application for which identifier analysis is being performed, how long they have remained active users, how long their average interaction sessions last, the activities they engage in during those sessions, and so on. Users who have only logged on a few times per week or month over some time period, and have been less engaged with the service or application, may be classified as "casual users" in some embodiments, while users whose accounts have only been in existence for a relatively short period may be referred to as "new users". The metadata stored at the service for the users may indicate the class into which each of the users have been placed by a classification model 382. In some embodiments, user names of users that have been classified as engaged, and are thus verified or trusted to at least some extent, may be included as examples to which the label "acceptable" is assigned, while user names of new or casual users may not necessarily be labeled as acceptable.

In at least one embodiment, one or more username synthesizing programs 392 may be used to generate artificial user names (i.e., user names which are not proposed by end users) to be used as "acceptable" examples and/or "unacceptable" examples. For example, random strings of a permitted length may be generated and used as acceptable examples, while variants of known abusive or offensive terms may be generated and used as examples with the "unacceptable" label.

The training data set 350 for the identifier analysis model may be generated by combining examples with "acceptable" labels 320 and examples with "unacceptable" labels in the depicted embodiment. Test data sets and/or evaluation data sets for the model may also be selected (e.g., using random sampling) from the examples with both types of labels in at least some embodiments.

Example Actions Based on Acceptability Scores

Figure 4:
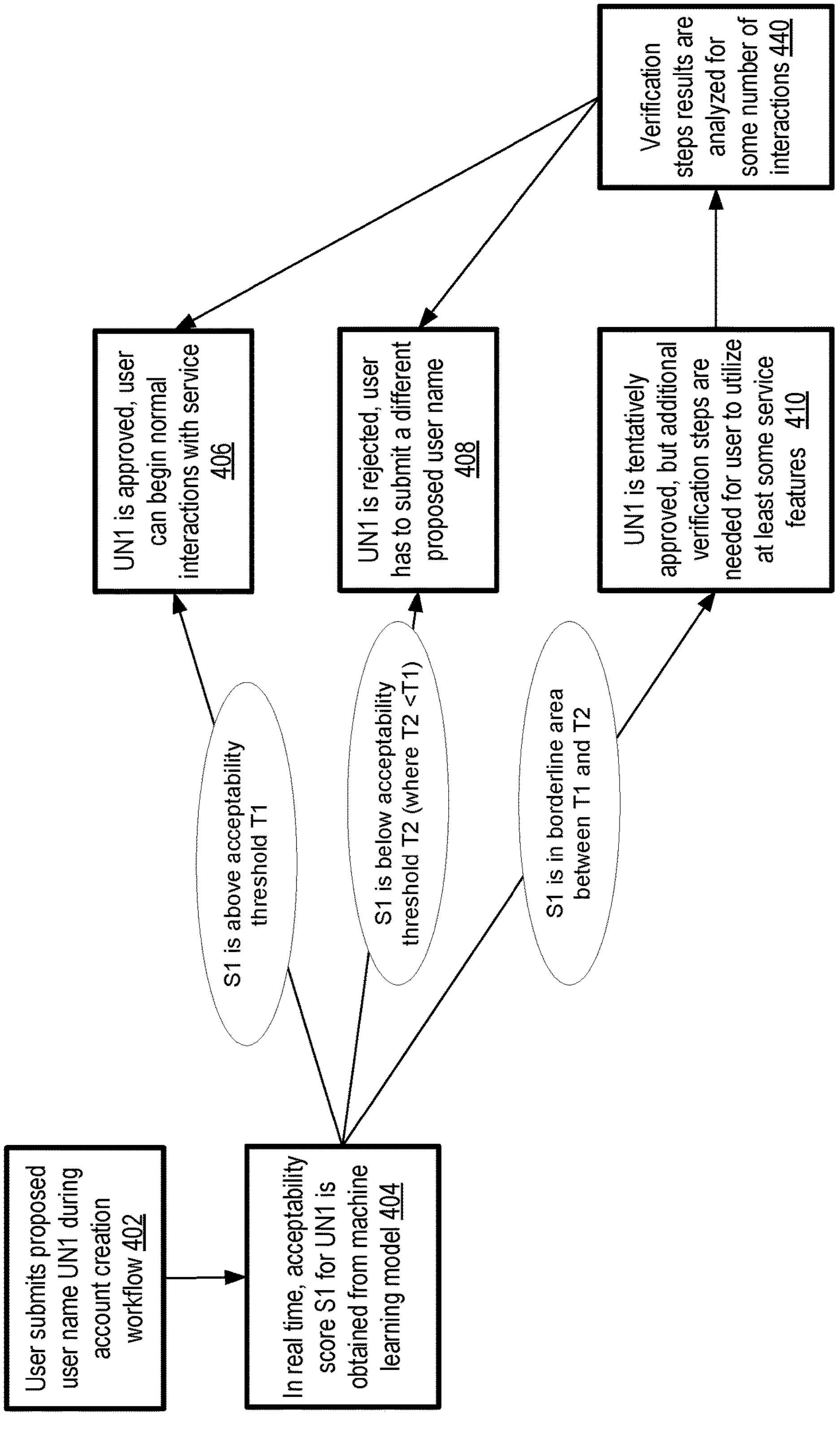
FIG. 4 illustrates examples of the kinds of actions which may be initiated at a network-accessible service based on acceptability scores generated for proposed user names, according to at least some embodiments.

FIG. 4 illustrates examples of the kinds of actions which may be initiated at a network-accessible service based on acceptability scores generated for proposed user names, according to at least some embodiments. When a user of such a service submits a proposed user name UN1 during the account creation workflow, as indicated in element 402, an acceptability score S1 may be generated for UN1 using a machine learning model similar to that described above in the context of FIG. 2, as indicated in element 404 of FIG. 4. Higher acceptability scores are assumed to indicate higher acceptability in the embodiment depicted in FIG. 4.

If S1 is above a first pre-determined acceptability threshold T1, UN1 may be approved in the depicted embodiment, and the user may begin normal interactions to utilize various features of the service as indicated in element 406. If S1 is below a different threshold T2 (where T2<T1), UN1 may be rejected (element 408), and the user may be requested to submit a different proposed user name, which may be subjected to the same type of analysis as UN1.

If S1 lies in a borderline range between T1 and T2, a different approach may be taken in the depicted embodiment, as indicated in elements 410 and 440. UN1 may be tentatively or provisionally approved, but additional verification steps may be needed for the user to utilize at least some features of the network-accessible service. For example, before posting a chat message, the user may be asked to authenticate via a phone number or email in some embodiments. If the user successfully authenticates via the phone number or email, the chat message may be accepted. After the results of the extra verification steps for a pre-determined number of interactions with the service are obtained (e.g., in one simple example, if a phone number based authentication succeeds), UN1 may be approved or rejected for at least a selected time period in the depicted embodiment.

In at least one embodiment, in scenarios in which the same user tries creating several different user names during a given session, and the user names tried are rejected based on possible offense, the system may treat further attempts to create user names by that user somewhat differently. If the user finally provides another user name which would otherwise have been accepted easily as an inoffensive user name, the fact that there were several unsuccessful attempts by that user may be taken into account when deciding how to treat the inoffensive user name. Such behavior, in which a single user tries out several offensive user names in quick succession, may alert the offensive content analysis subsystem that that user may be intending to cause offence eventually, and may be trying to work around the subsystem's offense detection capabilities, so the user may in effect be placed on probation (and treated in a manner similar to a user whose proposed user name has a borderline score).

In some embodiments, one or more of the parameter values used in the scenario depicted in FIG. 4 may be tuned over time. For example, the thresholds T1 and T2, and/or the additional verification steps needed for borderline acceptability scores may all be adjusted based on tracking the rate of offense complaints, the total number of identifiers rejected per unit time, the number of distinct users signing up for the service per unit time or the total number of active users, and/or other metrics.

Example Categories of Entity Identifiers

Figure 5:
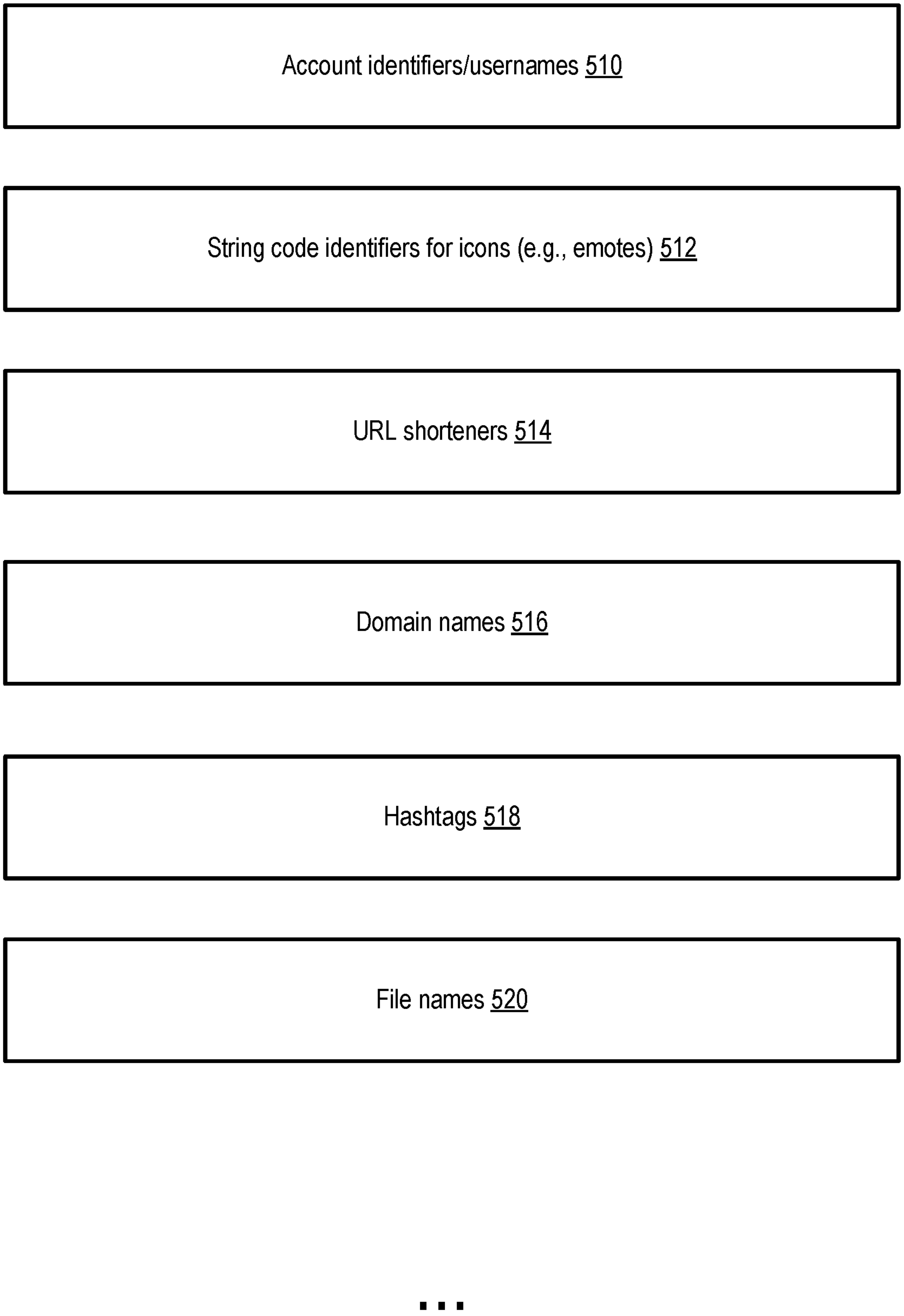
FIG. 5 illustrates examples of the types of entity identifiers for which offensive content analysis may be performed, according to at least some embodiments.

As mentioned earlier, machine learning based analysis of identifiers may be performed for a variety of categories of identifiers in any of several problem domains in different embodiments. FIG. 5 illustrates examples of the types of entity identifiers for which offensive content analysis may be performed, according to at least some embodiments. Account identifiers or user names 510 to be used to access the functionality of a given network-accessible or application may, for example, be selected by end users at the time at which they sign up for the service or application.

Some services, including popular services that enable thousands of end users to view, and share feedback on, the progress of video game contests or other dynamic visual content may allow the end users to select icons represent the end users' emotions, feelings or thoughts more concisely than sentences or phrases. Such icons, which are conceptually similar to emojis supported by various communication providers for text messages but may sometimes be exclusive to the service (or even limited for use by specific sub-groups of users of the service, or individual end users), may be referred to as "emotes" or emoticons in some embodiments. In some services or applications, users may submit images to be uses as such icons. The icons may each have a respective character-based label or identifier string, referred to in some cases as a code, which may be accessible to users of the service who wish to use the icons and/or interpret the intended meanings of the icons. Such string code identifiers for icons 512 may represent another category of identifiers which may be analyzed for offensive content in at least embodiments.

URL shorteners 514 and domain names 516 represent other categories of identifiers which may be chosen by users and checked for acceptability using machine learning techniques of the kind introduced herein in some embodiments. As indicated by the name, URL shorteners provide short versions of Uniform Resource Locators used as web addresses, so that for example instead of having to enter a long URL such as http://<exampledomain.com>/departmentA/sectionB/partC/pageD into a web browser, a user can use a unique shortened URL http://<string1>/<string2> which leads to the same web page as the original loner URL. If the owner/administrator of a service for providing URL shorteners allows its clients to select the strings used for at least a portion of the short versions of the URLs, such strings may be analyzed for acceptability using machine learning in various embodiments. Similarly, portions or all of full domain names selected by users for web sites may be analyzed for acceptability in at least some embodiments.

According to some embodiments, hashtags 518 (e.g., selected by end users and utilized to refer to topics, ideas or entities within social media message postings) may be analyzed for offensive content prior to being approved and displayed, e.g., by the service or application which is being used to convey/display messages which include the hashtags. In at least one embodiment, file names 520 (and/or folder names or other names of storage objects at shared repositories) which may be viewed by multiple users may be analyzed using the techniques proposed herein. Other types of entity identifiers, not shown in FIG. 5, may also or instead be analyzed in some embodiments prior to approval by a service or an application.

Example Use of Phonetic Representations

Figure 6:
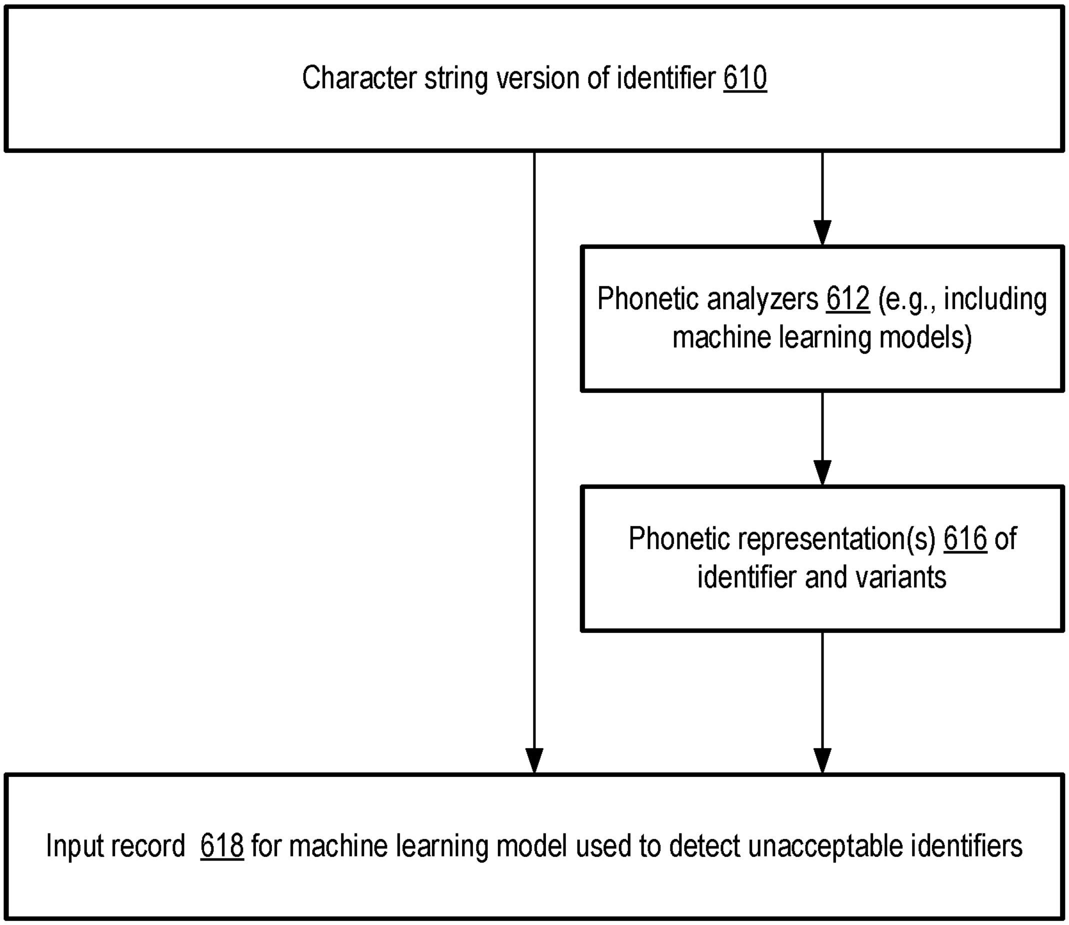
FIG. 6 illustrates an example use of phonetic representations of identifiers for offensive content analysis, according to at least some embodiments.

FIG. 6 illustrates an example use of phonetic representations of identifiers for offensive content analysis, according to at least some embodiments. In some cases, offense may be caused to some users of a service by the way an identifier (or a portion of an identifier) sounds when pronounced, and as a result, analysis of the written version of the identifier may by itself be insufficient to determine acceptability of the identifier.

In the embodiment shown in FIG. 6, the raw character string version 610 of an identifier may be provided as input to one or more phonetic analyzers 612. The phonetic analyzers may for example include machine learning models and/or other programs which are capable of transforming written text sequences into corresponding sounds. Phonetic representation(s) 616 of the original character string and/or variants thereof may be created using the phonetic analyzers, and included in the input record 618 corresponding to the identifier in at least some embodiments. Phonetic representations may be created for training examples (including both acceptable and unacceptable identifiers) as well for identifiers analyzed after the model has been trained in various embodiments. In some embodiments, only the phonetic representations or only the character string versions may be used as input to the model.

Methods for Analyzing Identifiers for Offensive Content

Figure 7:
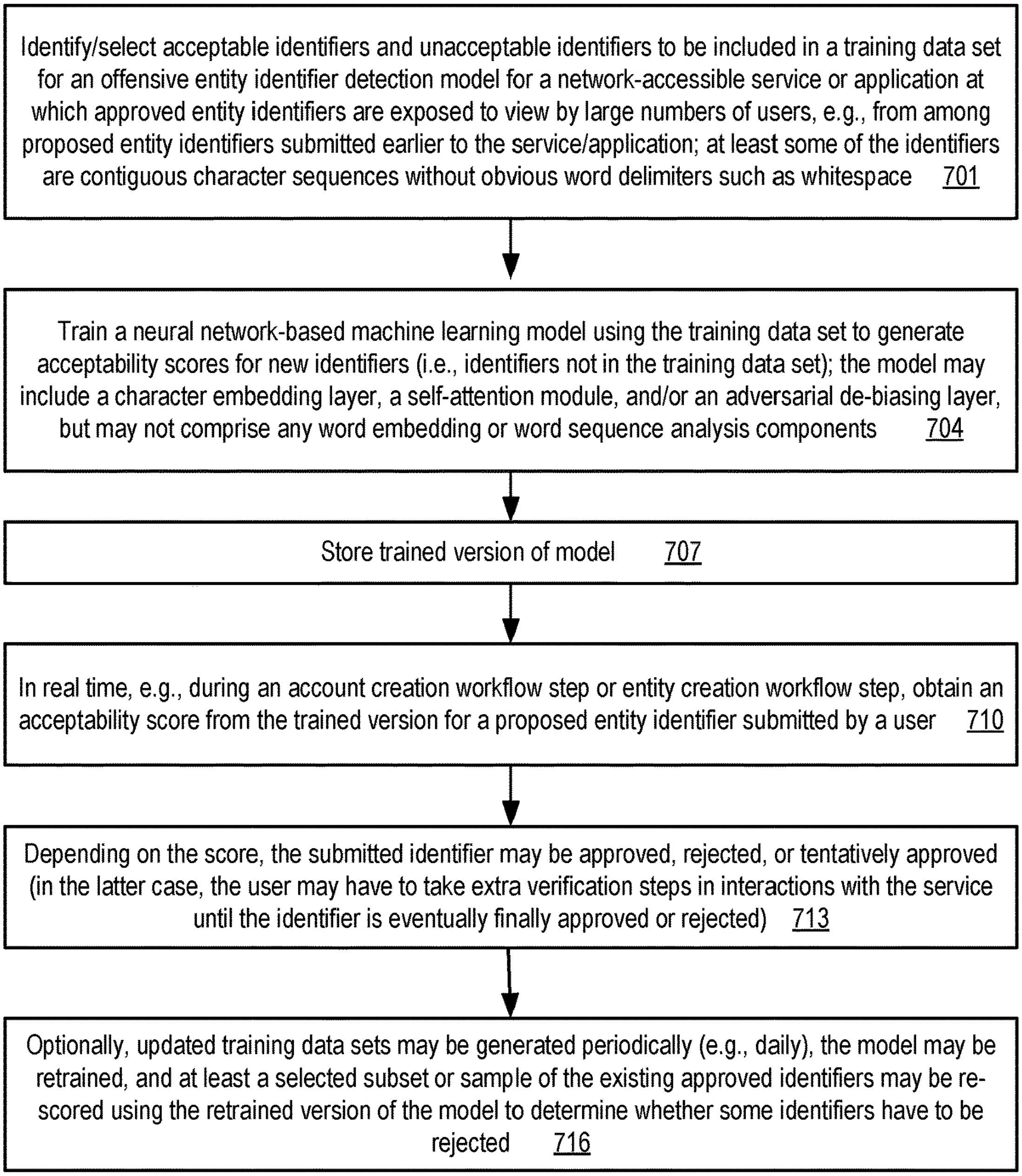
FIG. 7 is a flow diagram illustrating aspects of operations that may be performed to detect offensive entity identifiers at a service or application, according to at least some embodiments.

FIG. 7 is a flow diagram illustrating aspects of operations that may be performed to detect offensive entity identifiers at a service or application, according to at least some embodiments. As shown in element 701, acceptable and unacceptable identifiers may be selected or identified for inclusion in a training data set for an offensive entity identifier detection model for a network-accessible service or application at which approved entity identifiers are exposed to view by large numbers of users. The training data set identifiers may be selected, for example, from among proposed or candidate entity identifiers submitted earlier to the application or service (some of which may have been approved at the time that they were submitted, while others may have been rejected). In some cases, metadata associated with the candidate entity identifiers (e.g., metadata indicating that an identifier was submitted by a trusted or verified user with a long history of engagement with the service or application) may be used to select and/or label the candidates. At least some of the identifiers may comprise contiguous character sequences without obvious word delimiters such as whitespace or punctuation, and as such may not be easily broken down into constituent words. Constraints on the manner in which the entity identifiers can be constructed (such as "you can only user characters A-Z, a-z, numerals 0-9, and the underscore character _") may be enforced by the service or application in some embodiments.

Using the training data set, a neural network-based machine learning model may be trained in the depicted embodiment (element 704) to generate acceptability scores for new identifiers which are not part of the training data. The model may include various layers or components similar to those illustrated in FIG. 2 in at least some embodiments, such as a character-level embedding layer, a self-attention module, and/or an adversarial de-biasing layer. The model may not include any word-level embedding layer or word sequence analysis components in some embodiments.

A trained version of the model may be stored (element 707) in various embodiments. In real time, e.g., during an account creation workflow step or entity creation workflow step, an acceptability score may be obtained from the trained version of the model for a proposed entity identifier submitted by a user (element 710).

Based at least in part on the generated acceptability score, the proposed identifier may be approved, rejected or tentatively approved in various embodiments (element 713). If the identifier is approved, the user who submitted the identifier may be permitted to utilize various features of the service or application, including features which result in the display of the approved identifier to other users (such as an online chat feature). If the identifier is rejected, e.g., if its acceptability score is below a selected threshold which calls for immediate rejection, the user may not be permitted to utilize the proposed identifier; instead, a replacement identifier may have to be submitted, which in turn may be analyzed using the model. In some embodiments, some identifiers may be approved conditionally or tentatively, e.g., if their acceptability score lies within same range close higher than the threshold used for immediate rejection and/or of other conditions are met (e.g., if the identifier was submitted from an address from which unacceptable identifiers were received in the past). If an identifier is tentatively approved, the corresponding user may be required to take extra verification steps in at least some subsequent interactions with the service or application, such as requiring additional phone-based or email-based authentication in some embodiments. Eventually, after some number of such verification steps, the tentatively approved identifier may be approved or rejected in various embodiments.

Optionally, in at least one embodiment, an updated training data set may be generated periodically and the model may be re-trained using the updated versions (element 716). For example, depending on the volume of new candidate entity identifiers submitted to the service/application, and/or the count of complaints about offensive identifiers received at the service/application, the model may be re-trained daily, weekly or monthly in different implementations. At least a selected subset of existing approved identifiers may be re-scored using the retrained models in various embodiments. In one embodiment, for example, another model may be used to select subsets of approved identifiers (based on the proximity of the scores assigned earlier to the rejection threshold, based on user metadata associated with the identifiers, etc.) to be re-scored. Based on the re-scoring results, some previously-approved identifiers may be rejected, and the users who submitted such identifiers may have to submit acceptable replacements if they wish to continue utilizing the service or application.

Figure 8:
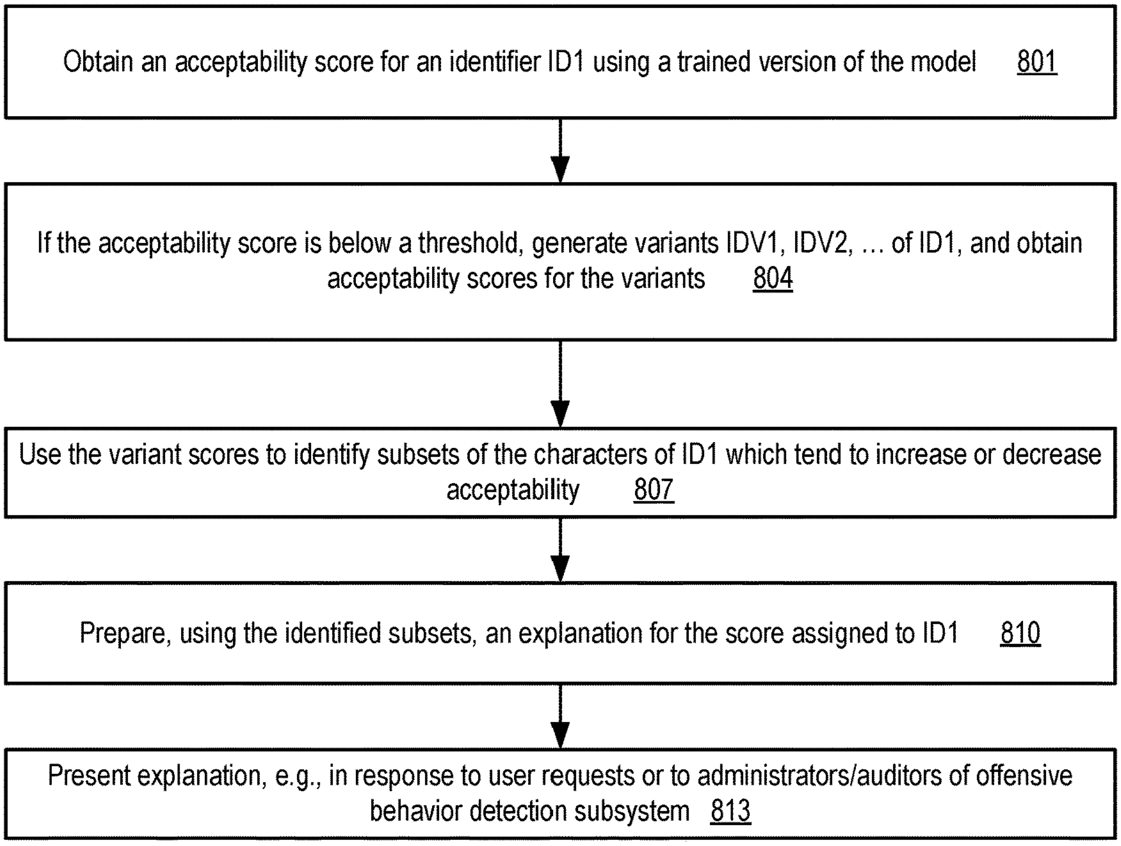
FIG. 8 is a flow diagram illustrating aspects of operations that may be performed to explain acceptability scores generated by a machine learning model, according to at least some embodiments.

FIG. 8 is a flow diagram illustrating aspects of operations that may be performed to explain acceptability scores generated by a machine learning model, according to at least some embodiments. As shown in element 801, an acceptability score may be obtained, using a trained version of a machine learning model similar to that discussed above, for an identifier ID1 submitted by a user of an application or service.

If the acceptability score is below a threshold, one or more variants of ID1 may be generated automatically in the depicted embodiment (element 804). Individual ones of the variants, such as IDV1, IDV2 and the like, may differ from ID1 in a small number of characters—e.g., some characters of ID1 may be replaced to obtain IDV2, some characters may be added or removed without replacement to generate IDV2, and so on. Respective acceptability scores may be obtained for individual ones of the variants using the trained model in at least some embodiments.

Using the scores generated for the variants and the original score of ID1, subsets of the characters of ID1 which tend to increase or decrease the acceptability score may be detected in various embodiments (element 807). For example, if the acceptability score increased dramatically if a character C1 of ID1 is substituted by character C2, this suggests that C1 plays a substantial role in the unacceptability of ID1; if the score does not change much as a result of the substitution, this implies that C1 by itself is not a significant contributor to the low acceptability score.

Based on the identified subsets of characters which appear to contribute substantially to the score of ID1, an explanation may be generated for ID1's score in some embodiments (element 810). The explanation may be presented to one or more individual or entities in various embodiments (element 813). For example, administrators or auditors of the offensive behavior detection subsystem of the service or application may be provided the explanation in some embodiments; if the explanation is found acceptable, confidence in the model may increase among the administrators or auditors. In other embodiments, users who submitted the identifiers which were deemed offensive may be provided corresponding explanations in response to queries or requests submitted by the users. In at least one embodiment, experiments similar to those shown in FIG. 8 for low acceptability scores may also or instead be conducted to explain high acceptability scores.

It is noted that in various embodiments, some of the operations shown in FIG. 7 and/or in FIG. 8 may be implemented in a different order than that shown in the figure, or may be performed in parallel rather than sequentially. Additionally, some of the operations shown in FIG. 7 and/or FIG. 8 may not be required in one or more implementations.

Example Provider Network Environment

Figure 9:
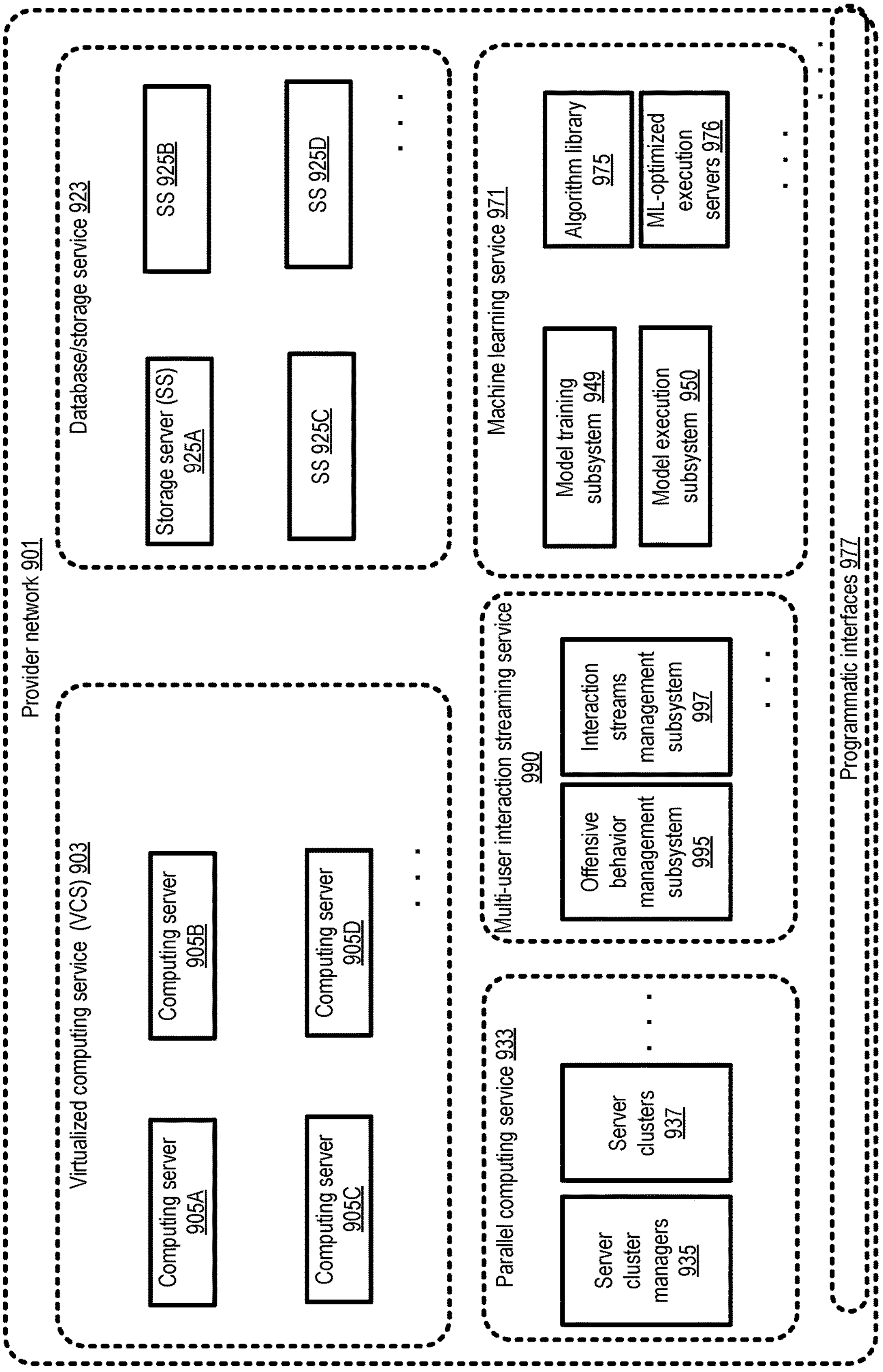
FIG. 9 illustrates an example provider network environment in which a machine learning service used for identifier analysis may be implemented, according to at least some embodiments.

FIG. 9 illustrates an example provider network environment in which a machine learning service used for identifier analysis may be implemented, according to at least some embodiments. In the depicted embodiment, provider network 901 may comprise resources used to implement a plurality of services, including for example a virtualized computing service (VCS) 903, a database/storage service 923, a parallel computing service 933 as well as a machine learning service 971 within which automated analysis of the kind described above to detect potentially offensive identifiers may be conducted. In some embodiments, a multi-user interaction streaming service 990 to which the identifiers to be analyzed are submitted by its end users may also be implemented at least in part at the provider network 901. The streaming service 990 may comprise an offensive behavior management subsystem 995 (similar in functionality to offensive content analysis subsystem 130 of FIG. 1) as well as an interaction streams management subsystem 997 (similar in functionality to real-time interactions management subsystem 140 of FIG. 1) in some embodiments.

The machine learning service 971, which may also be referred to as an analytics service or an artificial intelligence service, in turn may comprise algorithm library 975, model training subsystem 949 at which various types of models may be trained and re-trained using algorithms from library 975, model execution subsystem 950 at which the models are executed, as well as a set of machine learning-optimized execution servers 976 (e.g., servers comprising chipsets developed specifically for ML tasks) in the depicted embodiment. The parallel computing service 933 may include various server clusters 937, each comprising a plurality of servers, on which parallelizable workloads may be distributed by a set of server cluster managers 935 in the depicted embodiment. Some of the algorithms implemented at the machine learning service 971 may be parallelizable, and may utilize the server clusters 937 in at least some embodiments. In at least one embodiment, the provider network 901 may include a software container management service which may be employed to create and store container images to be used for training or executing machine learning models similar to the neural network-based model illustrated in FIG. 2.

Components of a given service may utilize components of other services in the depicted embodiment—e.g., for some machine learning service tasks and or stream-related tasks of service 990, virtual machines implemented at computing servers such as 905A-905D of the virtualized computing service 903 may be used, server clusters 937 and/or cluster managers 935 may be utilized for parallelizable computations of the machine learning service, input data, metrics and/or output produced at the machine learning service may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

Illustrative Computer System

Figure 10:
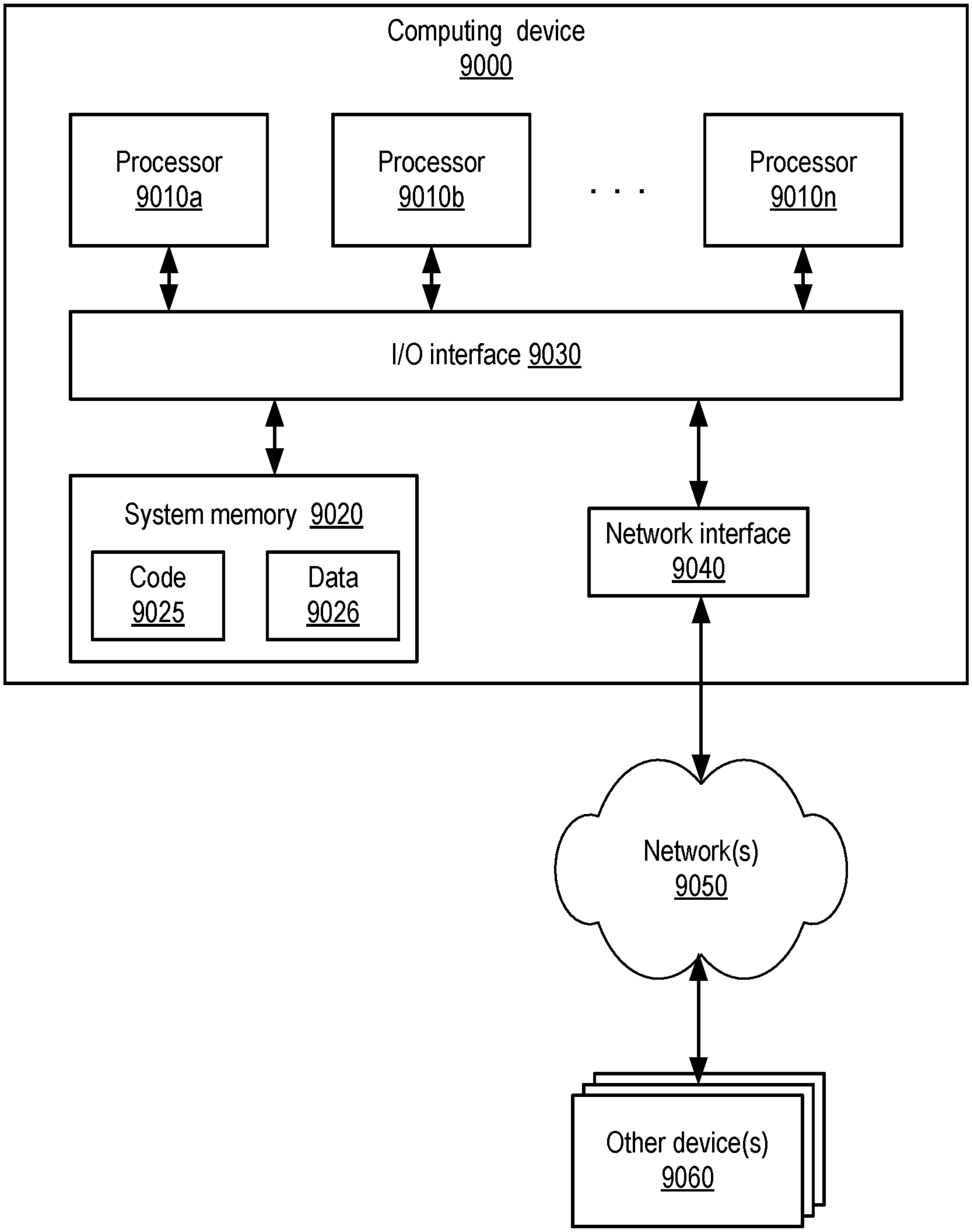
FIG. 10 is a block diagram illustrating an example computing device that may be used in at least some embodiments.

In at least some embodiments, a server that implements the types of techniques described herein (e.g., various functions of a machine learning service and other network-accessible services or applications similar to service 102 of FIG. 1), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

select, from a plurality of candidate entity identifiers associated with a network-accessible service, an acceptable identifier subset and an unacceptable identifier subset, wherein at least some of the candidate entity identifiers are (a) submitted by users of the network-accessible service and (b) exposed to other users of the network-accessible service via one or more programmatic interfaces, wherein at least some of the candidate entity identifiers comprise respective strings of characters which do not include word delimiters, and wherein at least some members of the unacceptable identifier subset violate an offensive terminology criterion of the network-accessible service;

train, using a training data set which includes at least the acceptable identifier subset and the unacceptable identifier subset, a neural network-based machine learning model to generate acceptability scores for proposed entity identifiers submitted to the network-accessible service, wherein the neural network-based machine learning model comprises at least (a) a character-level embedding layer and (b) a self-attention module, and wherein the neural network-based machine learning model does not include word embeddings;

obtain, using a trained version of the neural network-based machine learning model, an acceptability score for a proposed entity identifier received at the network-accessible service, wherein the proposed entity identifier satisfies a requirement for a contiguous string of characters without whitespace; and based at least in part on a determination that the acceptability score for the proposed entity identifier satisfies a threshold criterion, reject the proposed entity identifier.

2. The system as recited in claim 1, wherein the neural network-based machine learning model comprises an adversarial de-biasing module, wherein input provided to the neural network-based machine learning model during training comprises a representation of one or more protected terms, and wherein a loss function computed using the adversarial de-biasing module during training is indicative of a probability of a presence of a protected term of the one or more protected terms in an entity identifier analyzed using the neural network-based machine learning model.

3. The system as recited in claim 1, wherein the one or more computing devices include further instructions that upon execution on or across the one or more computing devices further cause the one or more computing devices to:

obtain one or more offense reports via one or more programmatic interfaces from users of the network-accessible service, wherein individual ones of the offense reports indicate respective entity identifiers; and determine a label for a particular entity identifier included in the training data set based at least in part on a count of offense reports in which the particular entity identifier was indicated.

4. The system as recited in claim 1, wherein the one or more computing devices include further instructions that upon execution on or across the one or more computing devices further cause the one or more computing devices to:

generate a phonetic representation of a particular candidate entity identifier of the plurality of candidate entity identifiers; and include, in the training data set, the phonetic representation.

5. The system as recited in claim 1, wherein the training data set comprises a first entity identifier in a first language and a second entity identifier in a second language.

6. A computer-implemented method, comprising:

training, using a training data set which includes a plurality of entity identifiers with respective acceptability labels, a neural network-based machine learning model to generate acceptability scores for proposed entity identifiers submitted to an application, wherein at least some entity identifiers included in the training data set comprise respective strings of characters which do not include word separators, and wherein the neural network-based machine learning model comprises at least a character-level embedding layer and does not utilize word embeddings;

obtaining, using a trained version of the neural network-based machine learning model, an acceptability score for a proposed entity identifier received at the application, wherein the proposed entity identifier satisfies a requirement for a contiguous string of characters without whitespace; and initiating one or more operations based at least in part on the acceptability score for the proposed entity identifier.

7. The computer-implemented method as recited in claim 6, wherein the neural network-based machine learning model comprises an adversarial de-biasing module, wherein input provided to the neural network-based machine learning model during training comprises a representation of one or more protected terms, and wherein a loss function computed using the adversarial de-biasing module during training is indicative of a probability of a presence of a protected term of the one or more protected terms in an entity identifier analyzed using the neural network-based machine learning model.

8. The computer-implemented method as recited in claim 6, further comprising:

obtaining one or more offense reports via one or more programmatic interfaces from users of the application, wherein individual ones of the offense reports indicate respective entity identifiers; and determining a label for a particular identifier included in the training data set based at least in part on a count of offense reports in which the particular identifier was indicated.

9. The computer-implemented method as recited in claim 6, further comprising:

classifying a plurality of users of the application into a plurality of groups based at least in part on engagement levels of the users with the application; and including, in the training data set, user identifiers of users of a particular group of the plurality of groups.

10. The computer-implemented method as recited in claim 6, further comprising:

generating a phonetic representation of a particular entity identifier of the plurality of entity identifiers; and including, in the training data set, the phonetic representation.

11. The computer-implemented method as recited in claim 6, further comprising:

conducting, with respect to a particular entity identifier for which the neural network-based machine learning model has generated a particular acceptability score, an analysis to generate a proposed explanation for the particular acceptability score, wherein the analysis comprises obtaining respective acceptability scores for a plurality of variants of the particular entity identifier from the neural network-based machine learning model; and providing, via one or more programmatic interfaces, the proposed explanation.

12. The computer-implemented method as recited in claim 6, wherein the one or more operations comprise one or more of: (a) providing an indication that the proposed entity identifier has been approved, (b) providing an indication that the proposed entity identifier has been rejected, or (c) identifying one or more verification actions to be taken by a user of the application prior to using the proposed entity identifier.

13. The computer-implemented method as recited in claim 6, wherein the one or more operations comprise providing an indication that the proposed entity identifier has been approved, the computer-implemented method further comprising:

retraining the neural network-based machine learning model using a modified training data set;

obtaining another acceptability score for the proposed entity identifier using a retrained version of the neural network-based machine learning model; and providing an indication, based at least in part on the other acceptability score, that the proposed entity identifier is no longer approved.

14. The computer-implemented method as recited in claim 6, wherein a particular entity identifier included in the training data set comprises a user name or an account name associated with a client account of the application.

15. The computer-implemented method as recited in claim 6, wherein a particular entity identifier included in the training data set comprises one or more of: (a) a label of an icon or a video displayed by the application, (b) a hashtag, (c) a Universal Record Locator (URL) shortener, (d) a portion of a domain name of one or more websites or (e) a file name.

16. One or more non-transitory computer-accessible storage media storing program instructions that when executed on or across one or more processors cause the one or more processors to:

train, using a training data set which includes a plurality of entity identifiers with respective acceptability labels, a neural network-based machine learning model to generate acceptability scores for proposed entity identifiers submitted to an application, wherein at least some of the entity identifiers included in the training data set comprise respective strings of characters which do not include word separators, and wherein the neural network-based machine learning model comprises at least a character-level embedding layer and does not utilize word embeddings;

obtain, using a trained version of the neural network-based machine learning model, an acceptability score for a proposed entity identifier received at the application, wherein the proposed entity identifier satisfies a requirement for a contiguous string of characters without whitespace; and initiate one or more operations based at least in part on the acceptability score obtained for the proposed entity identifier.

17. The one or more non-transitory computer-accessible storage media as recited in claim 16, wherein the application comprises a multi-user interactive online streaming interface, wherein the one or more operations comprise:

accepting the proposed entity identifier for use in the application; and causing the proposed entity identifier to be displayed via the multi-user interactive online streaming interface.

18. The one or more non-transitory computer-accessible storage media as recited in claim 16, wherein the neural network-based machine learning model comprises a self-attention module.

19. The one or more non-transitory computer-accessible storage media as recited in claim 16, storing further program instructions that when executed on or across the one or more processors further cause the one or more processors to:

obtain one or more offense reports via one or more programmatic interfaces from users of the application, wherein individual ones of the offense reports indicate respective entity identifiers; and determine a label for a particular entity identifier included in the training data set based at least in part on an analysis of offense reports in which the particular entity identifier was indicated.

20. The one or more non-transitory computer-accessible storage media as recited in claim 16, storing further program instructions that when executed on or across the one or more processors further cause the one or more processors to:

generate an entity identifier; and include the generated entity identifier in the training data set.

* * * * *